United States Patent [19]

Jinbo et al.

[11] 4,216,420
[45] Aug. 5, 1980

[54] BRAKING CONTROL SYSTEM SELECTIVELY OPERABLE IN DYNAMIC AND REGENERATIVE BRAKING OPERATION FOR ELECTRIC CAR

[75] Inventors: Yoshiji Jinbo; Eiji Kozu, both of Katsuta; Hiroshi Narita, Mito, all of Japan

[73] Assignee: Hitachi, Ltd., Tokyo, Japan

[21] Appl. No.: 929,956

[22] Filed: Aug. 1, 1978

[30] Foreign Application Priority Data

Aug. 10, 1977 [JP] Japan .................................. 52-95179

[51] Int. Cl.² .............................................. H02P 3/14
[52] U.S. Cl. ...................................... 318/370; 318/376
[58] Field of Search ............... 318/370, 375, 376, 366, 318/367, 379

[56] References Cited

U.S. PATENT DOCUMENTS

| | | | |
|---|---|---|---|
| 3,577,055 | 5/1971 | Hermansson | 318/370 |
| 3,593,089 | 7/1971 | Appelo | 318/376 |
| 3,657,625 | 4/1972 | Miller et al. | 318/370 |
| 3,876,920 | 4/1975 | Meissen et al. | 318/370 |
| 3,947,740 | 3/1976 | Tsuboi | 318/376 |
| 3,983,465 | 4/1975 | Tsuboi | 318/376 |
| 4,087,727 | 5/1978 | Horiuchi | 318/376 |

*Primary Examiner*—Gene Z. Rubinson
*Attorney, Agent, or Firm*—Craig and Antonelli

[57] ABSTRACT

A chopper and a series circuit of a dynamic braking resistor and a thyristor are connected in parallel with a d.c. motor which is operated as a generator during braking operation. A series circuit of a diode and an inductance element is connected in series with the d.c. motor. A condenser connected between the ground and the junction of the inductance element and the diode forms a filter circuit together with the inductance element. Current generated by the d.c. motor flows into a d.c. source through the diode and the inductance element during regenerative braking operation. An overvoltage detector fires the braking thyristor when the voltage across the condenser becomes greater than a predetermined limit value, as a result the dynamic braking operation is performed.

A chopper controller varies the interval between an ON pulse to turn the chopper into ON state and an OFF pulse to turn the chopper into OFF state for adjusting ON time and OFF time of the chopper in response to the current through the d.c. motor. An operation changer provides a signal to an automatic phase shifter to extend the interval between the ON and OFF pulses to a predetermined period of time enough to quench the braking thyristor when the braking operation of said d.c. motor is changed from the dynamic braking operation to the regenerative braking operation.

4 Claims, 2 Drawing Figures

BRAKING CONTROL SYSTEM SELECTIVELY OPERABLE IN DYNAMIC AND REGENERATIVE BRAKING OPERATION FOR ELECTRIC CAR

This invention relates to a braking control system selectively operable in dynamic braking and regenerative braking operation for an electric car.

Generally, a chopper controlled electric car uses both dynamic braking operation and regenerative braking operation. When the electric car enters a dead section or there is no other powered car under the same feeder line, the load absorbing the regenerated power is absent and therefore the regenerative braking fails to work. In the absence of the load for absorbing the regenerated power, the filter condenser is dangerously overcharged. In the event that the regenerative braking is impossible, therefore, transfer is made from regenerative braking to dynamic braking. In other words, when the fact that the voltage across the filter condenser has exceeded a predetermined limit value is detected by an overvoltage detector, the output of the detector is used to fire a thyristor connected in series with a dynamic braking resistor, so that the electric power generated by the DC motor is consumed in the dynamic braking resistor. When the load for absorbing the regenerated power is restored, the thyristor is turned off, thereby transferring again from dynamic braking operation to regenerative braking operation. Such a system is described in U.S. Pat. No. 3,657,625 filed by L. G. Miller et al. on Apr. 18, 1972.

In the control system disclosed in the above-mentioned patent, the thyristor in series with the dynamic braking resistor is turned off while the output terminals of the DC motor are short-circuited with the chopper turned on. With the increase in the value of the dynamic braking resistor used as a load for absorbing electric power, however, the inductance of the resistor reaches several tens of microhenries and so the current flowing through the resistor is reduced exponentially with the increase of the inductance. Even though no problem is posed if the ON period of the chopper is long, therefore, the required recovery current cannot be rendered to flow through the thyristor and so the thyristor can not be turned off when the ON period is short. When the ON period of the chopper is short, electric power may be regenerated to the power supply side at maximum rate. However, in this case, if the thyristor can not be turned off during ON period of the chopper, most of the electric power can not be regenerated thereby resulting in a great power loss. For turning off the thyristor positively upon ON state of the chopper, a non-inductive resistor has been used as the resistor or a quenching circuit has been added to the thyristor as disclosed in the U.S. Pat. No. 3,876,920 filed by W. Meissen et al. on Apr. 8, 1975. Both methods, however, complicate the construction.

Accordingly, it is an object of the present invention to provide a braking control system in which the dynamic braking thyristor is positively quenched to assure complete transfer from dynamic braking operation to regenerative braking operation.

Another object of the invention is to provide a system capable of quenching the dynamic braking thyristor positively without complicating the structure.

According to the present invention, there is provided a braking control system in which, in transferring from dynamic braking operation to regenerative braking operation, the ON time of the chopper is increased to a period longer than a predetermined period of time enough to quench the braking thyristor, thereby positively quenching the thyristor in series with the dynamic braking resistor. In order to extend the ON time of the chopper, either the phase of the ON pulse to turn the chopper into ON state is advanced with respect to the phase of the OFF pulse to turn the chopper into OFF state or the phase of the OFF pulse is delayed with respect to the phase of the ON pulse.

The present invention will be apparent from the following detailed description taken in conjunction with the accompanying drawings, in which.

Figure 1:
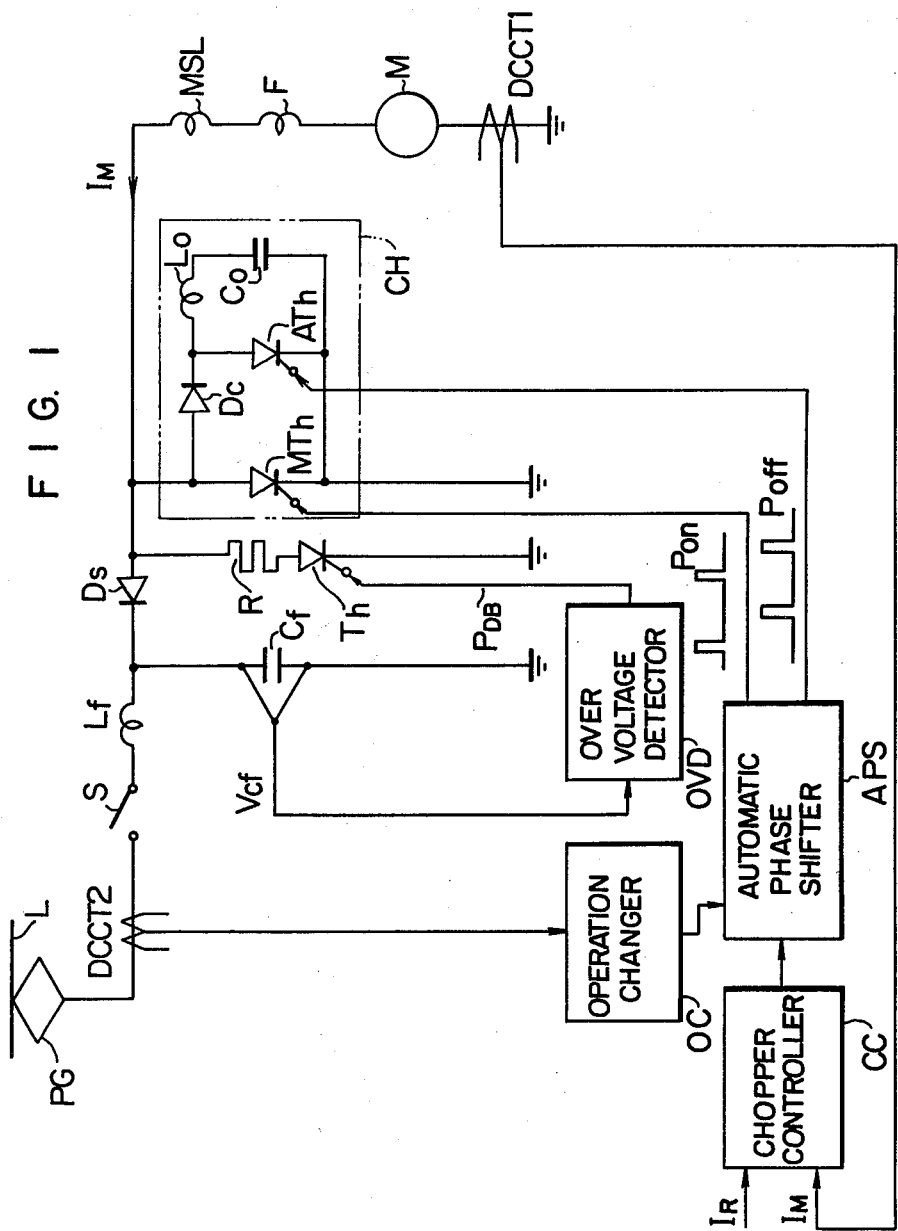
FIG. 1 is a circuit diagram illustrating a preferred embodiment of the present invention.

In FIG. 1, a DC motor includes an armature M and a series field winding F connected in series with each other. A smoothing coil MSL is connected in series to the DC motor for reducing the pulsation of the current flowing in the DC motor. In order to control the current flowing in the DC motor during braking operation, a chopper CH is connected in parallel to the DC motor. The chopper CH includes a main thyristor MTh, a quenching auxiliary thyristor ATh connected in parallel to the main thyristor MTh through a diode Dc, and a series circuit having a condenser Co and an inductance coil Lo in parallel to the auxiliary thyristor ATh. Upon application of an ON pulse Pon to the main thyristor MTh, the chopper CH is turned ON; while upon application of an OFF pulse Poff to the auxiliary thyristor ATh, the chopper is turned into OFF state. In the ON state, the chopper CH short-circuits the output terminals of the DC motor; while in the OFF state, it releases the output terminals thereof. A dynamic braking circuit is comprised of a dynamic braking resistor R and a thyristor Th in series with the dynamic braking resistor, and is connected in parallel to the DC motor. A diode Ds is for feeding back the power generated by the DC motor to a DC source L through a filter inductance coil Lf, a switch S and a pantograph PG during a regenerative braking operation. A filter condenser Cf is connected between the ground and the junction point of the filter inductance coil Lf and the diode Ds. An overvoltage detector OVD is for applying a firing pulse $P_{DB}$ to the thyristor Th for performing dynamic braking when the voltage across the condenser reaches a predetermined limit value. An automatic phase shifter APS generates the required ON pulse Pon and OFF pulse Poff in response to an input command signal, and applies the ON and OFF pulses to the main thyristor MTh and auxiliary thyristor ATh of the chopper CH respectively. A chopper controller CC compares a setting current $I_R$ with a current $I_M$ detected by a DC current detector DCCT1 and flowing in the DC motor, and the chopper controller controls the automatic phase shifter APS in such a manner that the DC current $I_M$ is equal to the setting current $I_R$. In other words, the chopper controller CC advances or delays the phase of the ON pulse Pon with respect to the OFF pulse Poff in response to the value of the output current $I_M$ of the DC motor so that the current $I_M$ of the DC motor may be controlled to be identical with the command value $I_R$. An operation changer OC controls the automatic phase shifter APS in such a manner that when the regenerated current flowing in the DC source through the diode Ds is detected by a DC current detector DCCT2, the phase of the ON pulse Pon is temporarily advanced thereby to enlarge the interval between ON pulse Pon and OFF pulse Poff more than the predetermined period of time To.

The operation of the system of the above-mentioned construction will be explained with reference to FIG. 2. When the electric car is running at high speed, the DC motor operated as a DC generator generates a high voltage, so that satisfactory regenerative braking operation is possible. In the case where the regenerative braking operation becomes impossible for some reason or other, however, the voltage across the filter condenser Cf increases to an excessively high level, with the result that, as explained above, the overvoltage detector OVD is actuated, thereby turning on the thyristor Th. In the section A of FIG. 2, the dynamic braking operation is performed under such a condition.

Figure 2:
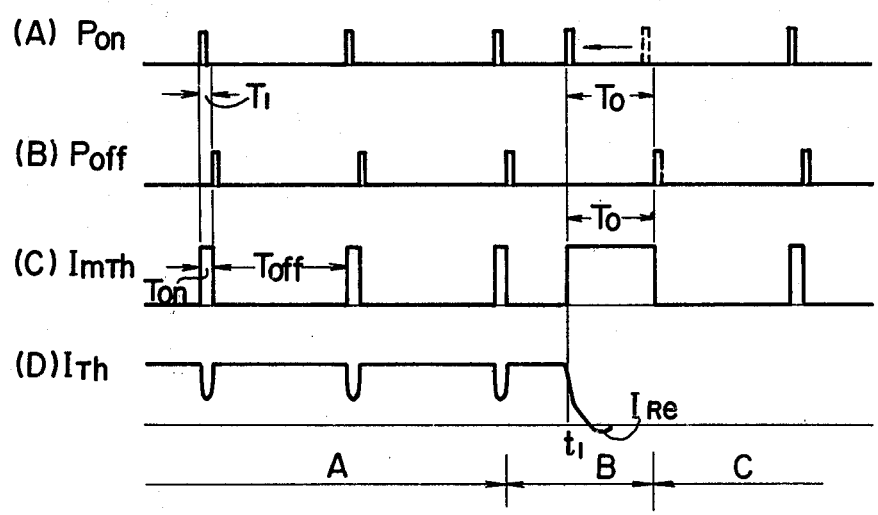
FIG. 2 is a time chart of correlated curves useful in understanding the operation of the present invention.

When the voltage generated by the DC motor is high, as shown in (A) and (B) of FIG. 2, the interval $T_1$ between ON pulse Pon and OFF pulse Poff is shortened, so that the current $I_{mTh}$ flowing through the main thyristor MTh during the ON time Ton thereof becomes as shown in (C) of FIG. 2. As a result the current ITh flowing through the thyristor Th in the dynamic braking circuit becomes continuous as shown in (D) thereby turning on the thyristor Th continuously.

At time point $t_1$ when the regenerative braking becomes possible, the current that has thus far flowed in the resistor R begins to flow toward the DC source L through the diode Ds, the filter inductance Lf, the switch S and the pantograph PG. This current is detected by the DC current detector DCCT2, which applies a signal to the operation changer OC. The operation changer, in response to the signal from the detector DCCT2, immediately advances the phase of the ON pulse Pon generated by the automatic phase shifter APS as shown in (A) of FIG. 2, and therefore the interval between ON pulse Pon and OFF pulse Poff is extended to the predetermined period of time To enough to quench the thyristor Th. As a result, the ON time Ton of the main thyristor MTh is extended to the predetermined period of time To as shown in (C) of the drawing. Thus, a sufficient recovery current $I_{RE}$ flows in the thyristor Th, so that the thyristor Th is positively quenched during the ON time of the chopper CH within the section B. According to an experiment, the thyristor Th could be turned off when the ON time Ton of the chopper CH is selected at a value more than 750 $\mu$s using the DC motor of 100 KW and the rated voltage of 300 V. In the section C of the drawing after the thyristor Th has been turned off, the regenerative braking operation is performed. As understood from this embodiment, transfer is made from dynamic braking operation to regenerative braking operation merely by regulating the phase of the ON pulse applied to the chopper and by extending the ON time Ton of the chopper longer than the predetermined period of time To.

What we claim is:

1. A braking control system selectively operable in dynamic braking and regenerative braking operation for an electric car comprising:
    a d.c. motor for driving the electric car;
    a chopping circuit connected in parallel with said d.c. motor to control a current flowing through said d.c. motor operated as a generator during braking operation;
    a diode connected between said d.c. motor and a d.c. source so as to permit the current to flow from said d.c. motor to the d.c. source therethrough during regenerative braking operation;
    a dynamic braking circuit including a braking resistor in series with a braking thyristor fired during dynamic braking operation, and coupled in parallel with said d.c. motor;
    a pulse generating circuit for providing a first pulse to turn said chopping circuit into ON state and a second pulse to turn said chopping circuit into OFF state;
    a chopper controlling circuit for varying the interval between the first and second pulses of said pulse generating circuit to adjust ON time and OFF time of said chopping circuit in response to the current of said d.c. motor;
    a change responsive means for controlling said pulse generating circuit to extend the ON time of said chopping circuit to a predetermined period of time enough to quench the braking thyristor when the braking operation of said d.c. motor is changed from the dynamic braking operation to the regenerative braking operation.

2. A braking control system selectively operable in dynamic braking and regenerative braking operation for an electric car as claimed in claim 1, in which said chopping circuit including a main thyristor which is turned into ON state in response to said first pulse and an auxiliary thyristor which is turned into ON state to quench said main thyristor in response to said second pulse.

3. A braking control system selectively operable in dynamic braking and regenerative braking operation for an electric car as claimed in claim 1, in which said change responsive means varies the interval between the first and second pulses of said pulse generating circuit to a predetermined period of time enough to quench said braking thyristor when the braking operation of said d.c. motor is changed from the dynamic braking operation to the regenerative braking operation.

4. A braking control system selectively operable in dynamic braking and regenerative braking operation for an electric car comprising:
    a d.c. motor for driving the electric car;
    a chopping circuit including a main thyristor and an auxiliary thyristor to quench said main thyristor, said chopping circuit being connected in parallel with said d.c. motor to control a current flowing through said d.c. motor operated as a generator during braking operation;
    a diode connected between said d.c. motor and a d.c. source so as to permit the current to flow from said d.c. motor to the d.c. source therethrough during regenerative braking operation;
    a filter circuit including an inductance element connected in series to said diode and a capacitor connected between the ground and the junction of said inductance element and said diode;
    a dynamic braking circuit including a braking resistor in series with a braking thyristor, and being coupled in parallel with said d.c. motor;
    a over-voltage detector for firing said braking thyristor in response to a predetermined voltage value across said capacitor of said filter circuit to perform dynamic braking;

a first current responsive means for detecting the current flowing through said d.c. motor;

a second current responsive means for detecting current flowing through said diode and producing an output signal representing the detection of the current;

a pulse generating circuit for providing a first pulse to turn on said main thyristor of said chopping circuit and a second pulse to turn on said auxiliary thyristor to quench said main thyristor;

a chopper controlling circuit for varying the interval between the first and second pulses of said pulse generating circuit to adjust ON time and OFF time of said main thyristor of said chopping circuit in response to the output signal of said first current responsive means;

a change responsive means for controlling said pulse generating circuit so as to vary the interval between said first and second pulses of said pulse generating circuit to a predetermined period of time enough to quench said braking thyristor in response to the output of said second current responsive means when the braking operation of said d.c. motor is changed from the dynamic braking operation to the regenerative braking operation.

* * * * *